US 12,151,355 B2

(12) United States Patent
Petersson et al.

(10) Patent No.: US 12,151,355 B2
(45) Date of Patent: Nov. 26, 2024

(54) FAULT DETECTION METHODS FOR POWER TOOLS

(71) Applicant: HUSQVARNA AB, Huskvarna (SE)

(72) Inventors: Ulf Petersson, Tollered (SE); Andreas Jönsson, Hallsberg (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/267,488

(22) PCT Filed: Dec. 13, 2021

(86) PCT No.: PCT/SE2021/051239
§ 371 (c)(1),
(2) Date: Jun. 15, 2023

(87) PCT Pub. No.: WO2022/131999
PCT Pub. Date: Jun. 23, 2022

(65) Prior Publication Data
US 2024/0051107 A1 Feb. 15, 2024

(30) Foreign Application Priority Data
Dec. 18, 2020 (SE) .................... 2051499-8

(51) Int. Cl.
*B25F 5/00* (2006.01)
(52) U.S. Cl.
CPC .................... *B25F 5/001* (2013.01)
(58) Field of Classification Search
CPC ...... H02P 6/30; H02P 6/24; H02P 6/16; H02P 6/12; H02P 6/22; H02P 29/028;
(Continued)

(56) References Cited

U.S. PATENT DOCUMENTS

2017/0008159 A1 1/2017 Boeck et al.
2017/0364800 A1 12/2017 Kiranyaz et al.
(Continued)

FOREIGN PATENT DOCUMENTS

DE 202014102103 U1 6/2015
DE 102017216697 A1 3/2019
(Continued)

OTHER PUBLICATIONS

International Search Report and Written Opinion for International Application No. PCT/SE2021/051276 mailed Feb. 18, 2022.
(Continued)

*Primary Examiner* — Nathaniel C Chukwurah
(74) *Attorney, Agent, or Firm* — Burr & Forman LLP

(57) ABSTRACT

A method performed in a control unit of a power tool driven by an electric motor, for detecting a fault state in the power tool, wherein the electric motor is associated with a motor current drawn over a motor interface, the method comprising monitoring a parameter of the electric motor during operation of the power tool, wherein the parameter is indicative of the motor current, obtaining a fault model, wherein the fault model is configured to classify a state of the power tool into a pre-determined number of states comprising one or more fault states, based on a series of electric motor parameter values, classifying a state of the power tool into the pre-determined number of states based on the fault model and on one or more values of the monitored electric motor parameter, and triggering an action by the power tool in case the state of the power tool is classified as a fault state.

20 Claims, 5 Drawing Sheets

(58) Field of Classification Search
CPC ..... H02P 29/0241; B23D 47/12; B23D 45/16; B23D 59/001; B25D 5/00; B27B 9/00; B27G 19/04; B23Q 11/0092; H02H 7/08; B25F 5/001

See application file for complete search history.

(56) References Cited

U.S. PATENT DOCUMENTS

| | | |
|---|---|---|
| 2018/0004217 A1 | 1/2018 | Biber et al. |
| 2018/0351494 A1* | 12/2018 | Tateda .................. G01R 31/40 |
| 2019/0101891 A1 | 4/2019 | Iijima et al. |
| 2019/0140566 A1* | 5/2019 | Pramod ............. G01R 19/0092 |
| 2019/0240804 A1 | 8/2019 | Zhang |
| 2019/0294144 A1 | 9/2019 | Takahara et al. |
| 2020/0171620 A1 | 6/2020 | Aubin et al. |

FOREIGN PATENT DOCUMENTS

| | | |
|---|---|---|
| EP | 2709799 B1 | 6/2015 |
| WO | 9905501 A1 | 2/1999 |
| WO | 2008019050 A1 | 2/2008 |
| WO | 2016064333 A1 | 4/2016 |
| WO | 2017215943 A1 | 12/2017 |

OTHER PUBLICATIONS

Swedish Office Action and Search Report for Swedish Application No. 2150217-4, Mailed on Oct. 29, 2021.
International Search Report and Written Opinion for International Application No. PCT/SE2021/051239 mailed Feb. 9, 2022.
Swedish Office Action and Search Report for Swedish Application No. 2051499-8, Mailed on Sep. 7, 2021.

* cited by examiner

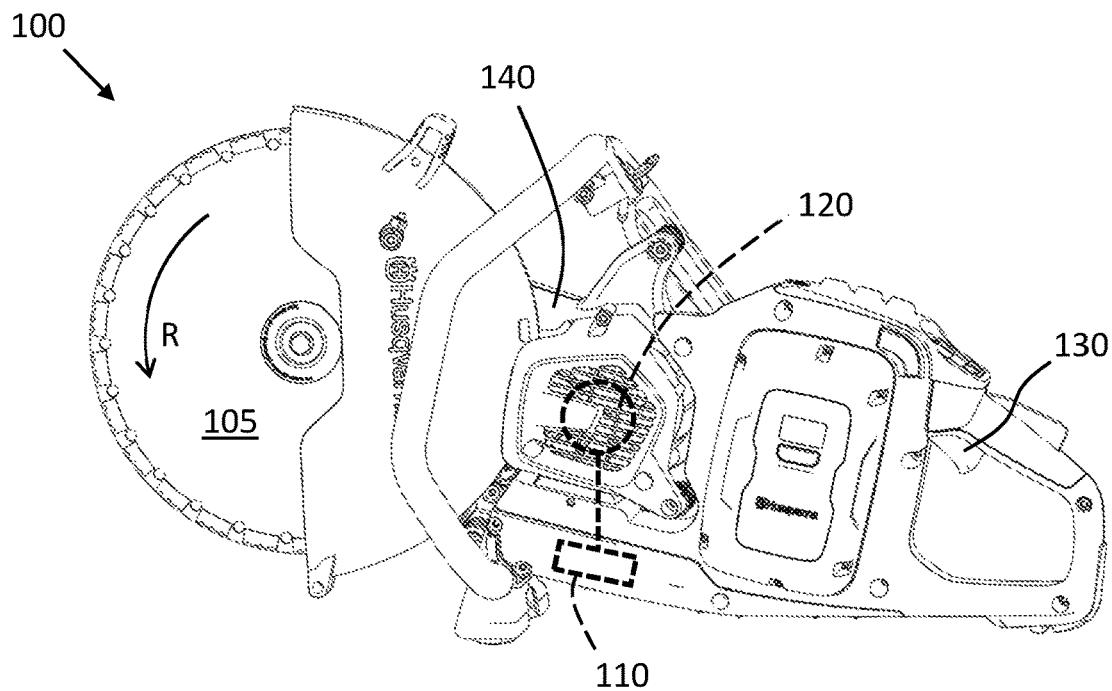
FIG. 1
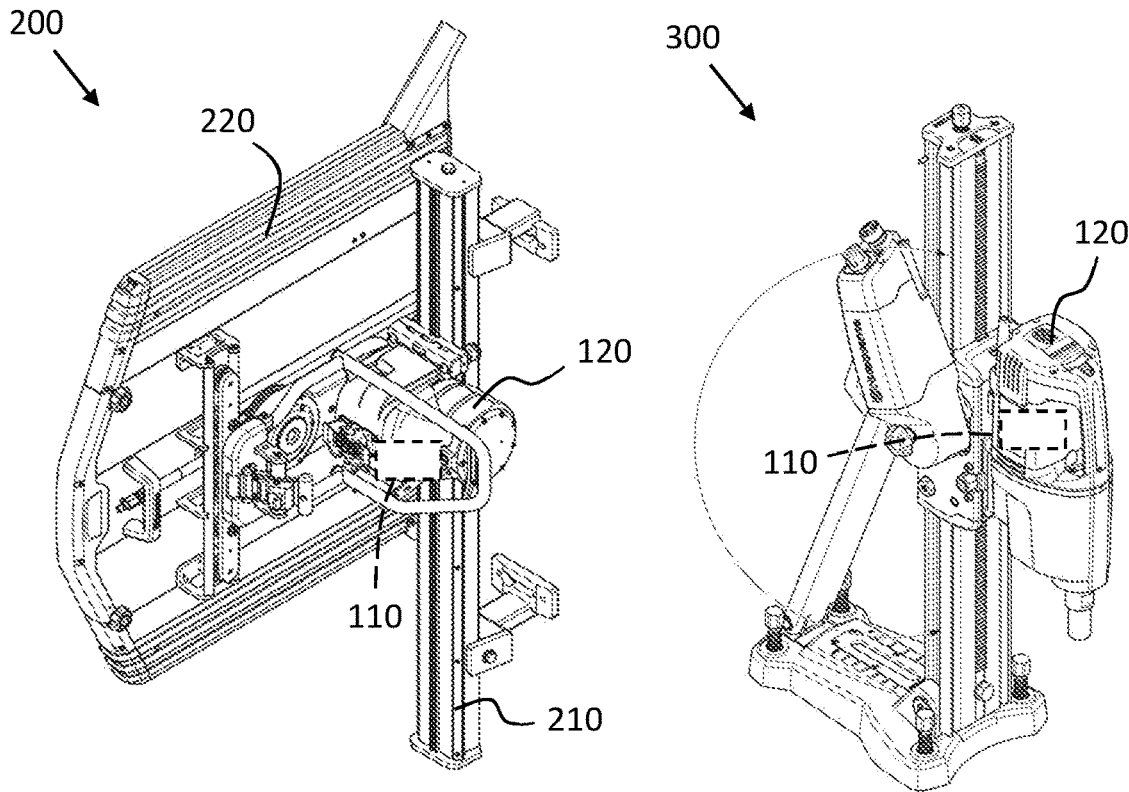
FIG. 2
FIG. 3

FAULT DETECTION METHODS FOR POWER TOOLS

TECHNICAL FIELD

The present disclosure relates to electrically powered construction equipment for abrasive processing of concrete and stone, such as cut-off tools, wall saws, and core drills. There are disclosed methods, control units and systems for fault detection. The disclosed methods may be advantageously implemented using machine learning methods.

BACKGROUND

Electrical power tools for processing concrete and stone, such as cut-off tools, wall saws and core drills, may suffer performance degradation or malfunction due to various fault states. For instance, cutting segments for abrasive operation may become mechanically damaged or suffer a glazing state, tool bearings may seize, and electrical motors may run hot.

Experienced operators are often able to detect such fault states due to a change in overall tool feel during operation. However, inexperienced operators and automated systems may not have this ability to detect when something is wrong with the power tool. Thus, prolonged use with faulty tools may occur.

A damaged power tool may pose a potential hazard to the operator and may cause more severe damage to the tool if use of the tool is not discontinued. Thus, there is a desire to be able to detect a fault state in a power tool as soon as it occurs, and preferably before the fault state leads to severe tool damage.

It is also desired to monitor occurrence of fault states in a set of tools. This would, for instance, allow a tool rental agency to keep track of a tool inventory.

US 2019294144 A1 describes a system for detecting an abnormality in the operation of a computer numerical control (CNC) machining tool. The described technique comprises determining an actual cutting section. The actual cutting section is then compared to a normal actual cutting section of usual machining, and abnormality is declared if there is a discrepancy between the two.

WO 9905501 A1 discloses a system for detection of faults in a tool based on a monitored power consumption of the tool. Data representing normal power consumption patterns is gathered in a learning mode and thresholds for power consumption are then calculated based on the gathered data. The measured power consumption during operation of the tool is compared to the calculated thresholds and fault is detected if a threshold is breached.

Despite of the advancements made in the field, there is a need for improved fault detection methods able to automatically detect fault conditions in power tools and trigger suitable actions in response to detecting the fault conditions.

SUMMARY

It is an object of the present disclosure to provide improved fault detection systems for power tools such as cut-off tools, wall saws and core drilling equipment. This object is obtained by a method performed in a control unit of a power tool driven by an electric motor, for detecting a fault condition in the power tool, wherein the electric motor is associated with a motor current drawn over a motor interface. The method comprises monitoring the motor current of the electric motor drawn over the motor interface during operation of the power tool. The method also comprises obtaining a fault model, wherein the fault model is configured to classify a state of the power tool into a pre-determined number of power tool states comprising one or more fault states, based on a series of electric motor current values, and classifying a state of the power tool into the pre-determined number of states based on the fault model and on one or more values of the monitored electric motor current. The method also comprises triggering an action by the power tool in case the state of the power tool is classified as a fault state.

Thus, advantageously, fault conditions can be automatically detected, and a suitable response action can be triggered by the control unit. It is an advantage that the detection mechanisms are based primarily on the motor current and does not need other sensor systems. In fact, one of the reasons that the herein disclosed methods are so effective at detecting a fault state in a rotatable tool for processing hard materials such as stone and concrete, and also classifying different fault states of such tools, is that the motor current is monitored as opposed to monitoring, e.g., power consumption or some other test variable. A change in back-EMF (electromagnetic force) by the electric machine used to drive the rotatable tool due to a given fault state will be immediately visible in the motor current drawn over the interface. Thus, by monitoring motor current, a reliable and robust detection mechanism is obtained.

The methods and techniques discussed herein are particularly useful in detecting fault states in rotatable work tools for processing concrete work objects, such as concrete saw blades used in wall saws or cut-off tools, core drill bits, and/or tools for grinding a concrete surface, such as a floor grinding tool. The fault condition detection techniques can be used to identify when a tool such as a saw blade or a core drill bit has suffered some form of malfunction, and also identify the type of malfunction, such that the tool can be serviced properly. According to aspects, the method further comprises initially training the fault model using recorded values of monitored electric motor currents corresponding to the one or more fault states. Thus, the fault model is adjusted to the specific type of use case of interest, i.e., to a specific tool or work task. This enables a more efficient and accurate fault detection mechanism. The training can be performed off-line under controlled circumstances, and the fault model can then be stored in a memory module of the tool. Thus, the detection mechanism can easily be tailored to a given tool. Also, several fault models can be stored in the memory module of the tool, and a suitable fault model can be selected in dependence of the type of tool which is currently being used.

Consequently, the object is also obtained by a control unit for a power tool driven by an electric motor, wherein the electric motor is associated with a motor current drawn over a motor interface. The control unit comprises a memory module arranged to store a plurality of fault models corresponding to respective rotatable concrete work tools, where each fault model in the plurality of fault models is configured to classify a state of a respective type of rotatable work tool into a pre-determined number of states comprising one or more fault states, based on a series of electric motor current values. The control unit is arranged to select a fault model from the plurality of fault models in dependence of a current type of rotatable work tool attached to the power tool. The control unit is also arranged to monitor the motor current of the electric motor drawn over the motor interface during operation of the power tool, and to classify a state of the power tool into the pre-determined number of states based on the fault model and on one or more values of the monitored electric motor current.

The control unit may of course also trigger an action by the power tool in case the state of the power tool is classified as a fault state.

According to aspects, the monitored currents of the electric motor comprise a D-Q transformed motor current. This parameter is easily measured and is often already conveniently available in existing electric motor control systems. Thus, the methods disclosed herein can be implemented as a software add-on in existing power tool control units.

According to aspects, the method further comprises monitoring meta data associated with the D-Q transformed motor current, wherein the meta data comprises any of frequency width of a sub-band, relative magnitude in a sub-band, a frequency sub-band power, and a frequency sub-band entropy of a Fourier transformed representation (1200) of the D-Q transformed motor current. This type of meta-data can be determined without prohibitive computational complexity and has been shown to provide accurate fault detection and state classification.

According to aspects, the method further comprises adjusting a sample or window size of the Fourier transform in dependence of a motor speed. This means that the Fourier transform is at least partly compensated for changes in motor speed. For instance, a homogenous frequency curve is obtained independent of the motor speed, which is an advantage since it simplifies further processing and fault state classification.

According to aspects, one or more additional parameters of the electric motor may also be monitored, such as one or more state variables of an electric motor regulator module. These state variables are normally already available internally in the control unit, thus, detection based on such internal state variables can be conveniently implemented in most control units.

According to aspects, the monitored parameter of the electric motor comprises an estimated rotor angle of the electric motor. This estimated rotor angle has been shown to comprise significant amounts of relevant information for the detection of fault conditions in power tools such as cut-off tools and other types of concrete processing equipment.

According to aspects, the method further comprises monitoring an output from any of an inertial measurement unit (IMU) a temperature sensor, a dust sensor, and/or a vision-based sensor. This additional sensor data acts as a complement which further increases the performance of the proposed methods in terms of detection performance.

According to aspects, the fault model is based on a random forest ensemble learning method. The random forest ensemble learning method has been shown to provide adequate detection performance despite sometimes having limited amounts of measurement data available.

According to aspects, the fault model is based on a neural network. A neural network, once properly configured and trained, provides excellent classification performance for these types of applications.

As discussed above, the method optionally comprises configuring the fault model in dependence of the type of power tool and/or the dimension and type of the concrete processing member, such as the type and dimension of saw blade or core drill bit. This way the fault detection can be tailored to a specific type of tool, which improves detection performance in many scenarios. The control unit can be designed to store a plurality of fault models, and a selection of fault model can be made in dependence of the type of tool currently being used. Since the fault model is tailored to a given type of tool, a more reliable and accurate fault detection can be obtained.

According to aspects, each fault state is associated with one out of a pre-determined number of severity levels. This means that the method not only detects fault conditions but is also able to indicate a severity level of the detected fault condition. Thus, similar to the warning symbols in a car, a less severe warning can be indicated to the operator as an instruction to service and check up on the tool in the near future, while a more severe fault condition can trigger a notification to immediately cease using the tool. Thus, the triggered action may for instance comprise notifying an operator of the fault state and its associated severity level. The triggered action may also comprise disabling the power tool in case the current state is classified as a fault state associated with a pre-determined severity level.

According to aspects, disabling the power tool comprises executing an emergency brake by the electric motor. Since the power tool is rapidly halted as soon as malfunction occurs, the risk that an operator is injured, or work-piece is damaged because of the power tool fault condition is reduced.

According to aspects, the method further comprises receiving an updated fault model from an external entity and replacing the fault model by the updated fault model. By training the fault model in an external entity, more processing power can be exploited. The power tool normally does not comprise the amount of processing power required for detailed training and verification of fault models for these purposes.

According to aspects, the method further comprises storing the recorded values of the monitored electric motor parameter in a memory module. This stored data may be valuable for forensics after a fault condition has occurred. In particular if an undetected fault condition occurs. The data can be used to further refine the fault model for the particular type of tool, thereby gradually improving the performance of the system over time.

According to aspects, the method further comprises configuring an operating parameter of the power tool in dependence of a detected fault state. This way the power tool operation can be optimized to account for the detected condition. For instance, the method may comprise configuring a tool speed and/or segment pressure in dependence of a detected fault state associated with tool glazing. The method may also comprise configuring a pulsed drive of the electric motor pulse in dependence of a detected fault state associated with a non-circular cutting disc shape.

There are also disclosed herein control units and power tools associated with the above-mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where FIGS. 1-3 show examples of electrically powered tools;

DETAILED DESCRIPTION

Figure 4:
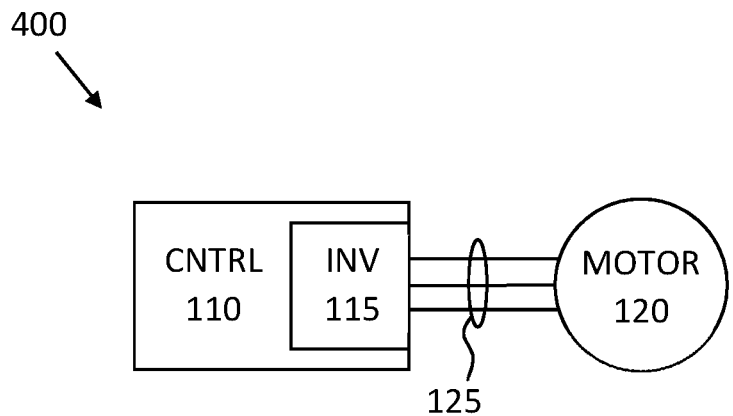
FIG. 4 schematically illustrates a three-phase electric motor control system based on an inverter.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 shows a hand-held electrically powered cut-off tool 100 for cutting into hard materials such as concrete and stone. The tool 100 comprises a rotatable circular cutting disc 105, which may also be referred to as a cutting blade, mounted on a support arm. The cutting disc 105 is normally brought into rotation in a down-cut direction R, i.e., downwards into the object to be cut. The cutting disc 105 is arranged for abrasive operation, by means of cutting segments on the periphery of the cutting disc 105, where the cutting segments comprise diamond granules and the like embedded in a cutting segment matrix.

An electric motor 120 is arranged to drive the cutting tool via a drive arrangement in the support arm 140. This motor is powered from an electrical energy storage device, such as a battery or a super-capacitor. Alternatively, the electric motor may be powered at least in part from electrical mains via cable.

The electric motor 120 is controlled by a control unit 110 via a motor interface. The motor interface may vary in function and physical realization, but the control unit 110 controls electric motor speed over the interface, and may both accelerate and decelerate, i.e., brake, the electric motor via the motor interface. The electric motor draws current over the motor interface.

FIG. 2 shows a wall saw arranged to traverse a guide 210 to produce a straight cut in a concrete element, e.g., to make an opening for a door or a window in a concrete wall. The operation of the wall saw is similar to that of the cut-off tool 100. Indeed, the wall saw is in many respects essentially a cut-off tool mounted slidably on the guide 210. Thus, the wall saw also comprises a cutting disc (hidden behind the cover 220). This cutting disc is arranged for abrasive operation, by means of cutting segments on the periphery of the cutting disc 105. The cutting disc of the wall saw 200 is driven by an electric motor arranged to be controlled by a control unit 110. The electric motor 120 may be battery powered but is normally at least partially powered from electrical mains. Some wall says use chains comprising cutting segments instead of discs. One such chain-based wall saw 750c is shown below in FIG. 7.

FIG. 3 illustrates an example core drill 300. A core drill is a power tool arranged to cut larger holes in concrete slabs (i.e. extract cores), e.g., for creating ventilation ducts and other through-holes. This core drill is also electrically powered by battery or from electrical mains. The electric motor 120 is controlled by a control unit 110. The core drill bit (not shown in FIG. 3) is a cylindrically shaped drill bit where cutting segments for abrasive operation have been attached to the distal perimeter, i.e., the edge facing away from the machine.

The types of power tools 100, 200, 300 shown in FIGS. 1-3 are known in general and will therefore not be discussed in more detail herein.

The power tools 100, 200, 300 may suffer a variety of different fault states or fault conditions, such as different types of malfunction and reasons for reduced tool performance. For instance, one or more of the cutting segments attached to the cutting disc, drill bit or chain, may detach during operation, or at least partially break. A power tool with a damaged cutting disc, drill bit or chain is normally associated with a reduced cutting performance. Such damaged cutting implements may also pose a risk to an operator since the risk of undesired kickback events and the like may increase. There is also a risk that the concrete element being cut may become damaged during operation, which of course is undesired.

Cutting discs such as those used with cut-off tools and wall saws may also under unfortunate circumstances obtain a non-circular perimeter, where some cutting segments along the perimeter become more worn than others. The cutting disc may, e.g., become oval shaped, which is undesired since it reduces cutting performance and may be uncomfortable for an operator or even dangerous for the operator due to an increased risk of a kickback event.

Glazing refers to an effect where the abrasive cutting segments become dull and stop cutting. Glazing occurs when the cutting segment matrix holding the abrasive particles, i.e., the diamond granules or the like, overheat and cover the abrading particles. The risk of glazing is a function of the applied force to the cutting segment and the velocity of the cutting segments relative to the concrete slab. In particular, the risk of glazing increases if the cutting segment is operated at high velocity and with low pressure against the concrete. With higher pressure on the cutting segment, a larger velocity can normally be tolerated and vice versa.

The drive system of the power tool 100, 200, 300 often comprises some form of transmission, such as a geared transmission, between the electrical motor shaft and the tool itself. This transmission is under constant strain during use. Although transmissions for these types of applications are sturdy and built to withstand severe mechanical stress, the transmissions sometimes brake down. When this happens the machine stops functioning.

Another fault condition which may be experienced during operation of any of the power tools 100, 200, 300 is a seized bearing or a bearing running hot due to undesired friction.

This fault state may become severe enough to prevent further operation of the power tool.

Some fault states, such as a damaged cutting disc, a seized bearing, or a broken transmission, are severe fault states, meaning that a power tool must immediately be stopped and taken out of service. Continued operation under severe fault states may be dangerous and may cause further irreparable damage to the tool.

Other fault states are serious enough to merit immediately notifying the operator, but not severe enough to warrant taking the machine out of service straight away. These fault semi-severe conditions indicate that the power tool should be checked in order to determine the cause of the fault state, and perhaps serviced in order to fix the problem before it leads to worse damage. An example of this type of semi-severe fault state may be a slightly overheated machine part, a tendency towards an oval cutting disc, or the like.

The electric motor arranged to drive the tools 100, 200, 300 may be a permanent magnet synchronous motor (PMSM) which is an alternating current (AC) synchronous motor whose field excitation is provided by permanent magnets, and which has a sinusoidal counter-electromotive force (counter EMF) waveform, also known as back electromotive force (back EMF) waveform. PMSM motors are known in general and will therefore not be discussed in more detail herein. For instance, similar electrical motors including associated control methods are discussed in "Electric Motors and Drives" (Fifth Edition), Elsevier, ISBN 978-0-08-102615-1, 2019, by Austin Hughes and Bill Drury.

The motor 120 may be a three-phase motor as schematically shown in FIG. 4, which shows a set-up where the control unit 110 controls an inverter 115 which controls current over the motor interface 125. In this case the motor interface 125 comprises three wires for energizing the motor windings. The inverter 115 is normally controlled by a current command from the control unit 110. An inverter is a module which generates one or more phases of alternating current, normally from a DC feed. Thus, the set-up 400 is suitable for battery-powered devices. By controlling the frequency and voltage of the phases over the motor interface, the electromagnetic field in the motor can be brought into a controlled rotation to generate a positive torque by the motor shaft, which then can be used to power, e.g., the cutting disc 105. The electric motor can also be used to provide negative torque to the motor shaft, i.e., to brake the cutting disc 105.

The electric motor may also be arranged to be driven by a three-phase current from electrical mains, in which case another type of suitable drive circuit may be required.

It has been realized that the control signals by which the control unit controls the electric motor, i.e., the currents drawn by the electric motor 120 over the motor interface 125, and the state variables of the control unit 110 for the motor control comprise valuable information which can be used for real-time fault detection of the above-mentioned fault states as well as other fault states. It has also been realized that the currents drawn by the electric motor 120 over the motor interface 125, and the state variables of the control unit 110 for the motor control can be used for predicting imminent fault states, i.e., fault states which have not yet occurred, but which are likely to occur in the near term. Thus, advantageously, the methods disclosed herein may be configured to not only detect fault states after they have occurred but also to indicate a fault state about to occur, i.e., a fault state associated with an increased risk of occurring in the near future. For instance, many fault states of rotatable concrete processing tools, such as abrasive saw blades and core drill bits, can be detected in the back-EMF of the electric motor, which can be seen by monitoring the motor current over the motor interface 125.

The control signals and internal parameters of the electric motor and its control system can be monitored, and different types of classification algorithms can be used to detect when the control signals are indicative of a fault state, as opposed to when the power tool is operating normally. For instance, the currents over the motor interface 125 can be used to detect one or more of the above-mentioned fault states. Internal regulator variables, such as internal state variables of a PID regulator or the like, executed by the control unit 110, can also be used to indicate fault states.

The detection mechanisms are advantageously based on machine learning techniques. Diverse types of machine learning techniques have been applied with success, but it has been found that algorithms based on random forest techniques are particularly effective and provide robust prediction of fault events. Various types of neural networks may also be applied with success to this classification task.

Random forests or random decision forests represent an ensemble learning method for classification, regression and other tasks that operate by constructing a multitude of decision trees at training time and outputting the class that is the mode of the classes (classification) or mean/average prediction (regression) of the individual trees. Random decision forests are associated with the advantage of being able to correct for decision trees' habit of overfitting to their training set. Random forests generally outperform decision tree-based algorithms.

As an alternative to random forest classification methods, a less complex decision tree algorithm can be used, often referred to as regression tree algorithms, which is basically a single tree random forest algorithm.

The machine learning techniques used herein comprise the construction of a fault model which can be configured, i.e., "trained", using a plurality of examples of power tools which have experienced various fault states. Measurement data of one or more parameters related to the operation of the electric motor of the power tools is stored and tagged with a respective fault state, which data is then used to train the fault model in a training phase. The thus configured fault model can then be fed by measurement data in real-time during operation of a power tool. If the power tool experiences a fault state similar to one or more of the training examples, then the fault model is likely to classify the power tool as being associated with a fault state. The fault model is not only able to determine that a given power tool experiences a fault state, but it may also be configured to determine which fault state out of a pre-determined number of fault states that has occurred.

Training of a machine learning model for fault state classification is advantageously done using a hold-out dataset, where one part of the data set is used to train the model, and another part is used for verification of the trained model.

Some aspects of the herein discussed fault detection methods differ from the prior art since the detection mechanisms are based on training using tools that have experienced known faults. The reasons for the fault may not be entirely known, nor its physical implications on parameters that can be measured, such as vibration and the like. However, by training a fault model to recognize the fault state, future occurrences of the fault state can be correctly classified, and a proper course of action can be taken to alleviate the consequences of the fault state.

By using fault models that have been constructed based on measurements of motor current drawn by power tools associated with one or more known fault states, there is no longer a need for a physical analysis of the consequences of the fault state in terms of, e.g., consumed power as in WO 9905501 A1.

The principle of gathering motor current data from power tools having suffered known fault states, and later on using this motor current data to build fault models with can be used to detect when these fault states occur in other power tools is a main principle of the present disclosure. The principle can be described as a method performed in a control unit 110 of a power tool 100, 200, 300 driven by an electric motor 120, for detecting a fault condition in the power tool 100, 200, 300, wherein the electric motor 120 is associated with a motor current drawn over a motor interface 125. The method comprises obtaining a fault model configured to classify a state of the power tool into a pre-determined number of power tool states comprising one or more fault states, based on a comparison of a series of electric motor current values drawn over the motor interface 125 during operation of the power tool to a corresponding series of electric motor current values drawn over a motor interface of a power tool having suffered a known fault condition, and classifying a state of the power tool 100, 200, 300 into the pre-determined number of states based on the fault model and on one or more values of the monitored electric motor current.

Figure 5:
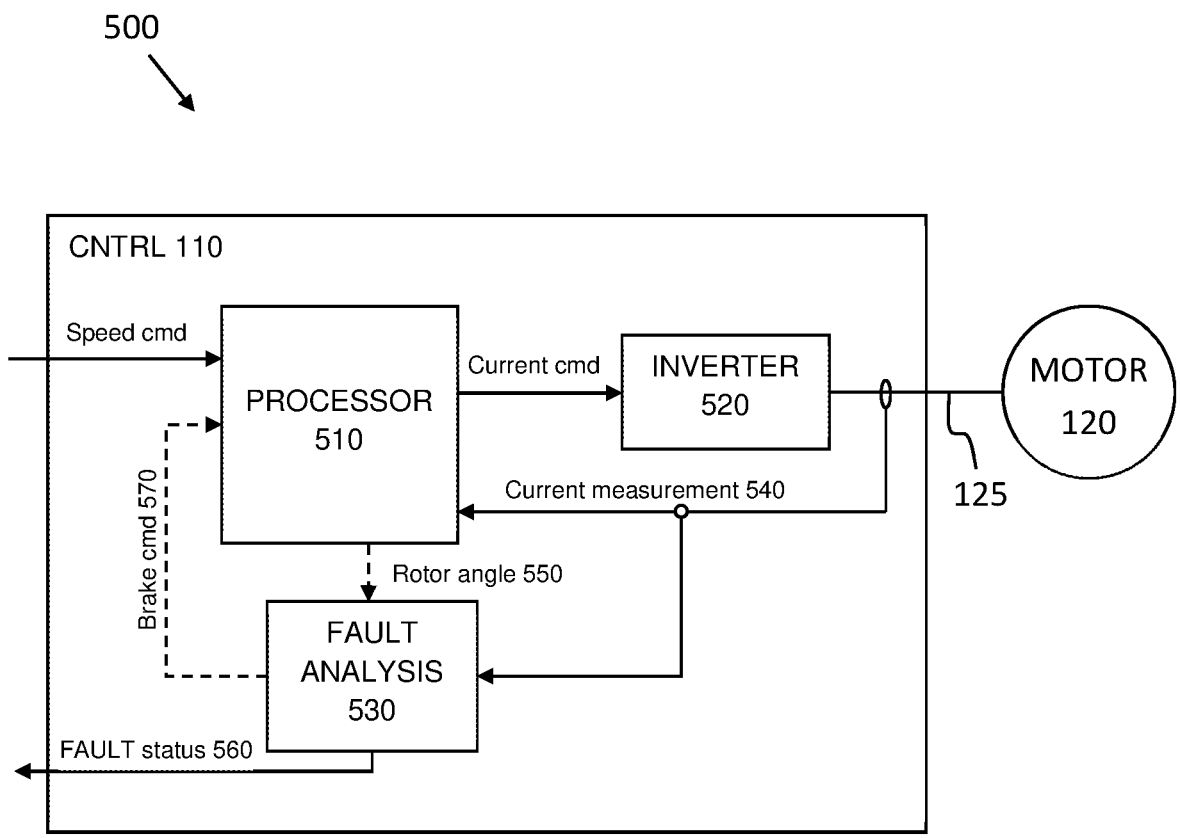
FIG. 5 is a functional view of an example tool control system.

FIG. 5 shows a functional view of an example fault detection system for use with, e.g., one of the power tools 100, 200, 300 exemplified above. A speed command is obtained, e.g., from a trigger 130 on the tool 100, or from user configuration of the power tool. The speed command is input to a processor 510 which will be discussed in more detail below in connection to FIG. 10. The processor 510 converts the speed command into a current command which is sent to an inverter 520, which in turn controls the electric motor 120 via the motor interface 125. In case the motor 120 is a three-phase motor, the control interface 125 comprises three wires with respective phases.

A current measurement 540 taken in connection to the motor interface 125 is fed back to the processor 510, whereby a closed loop motor control system is formed. As part of this closed loop control system, the processor 510 optionally maintains an estimate of rotor angle 550. There are many known ways to estimate rotor angle in an electric machine, e.g., based on the current measurements on the motor interface 125. For instance, in "Electric Motors and Drives" (Fifth Edition), Elsevier, ISBN 978-0-08-102615-1, 2019, Austin Hughes and Bill Drury discuss the topic at length.

A fault analysis module 530 is arranged to receive measurements of current taken over the motor interface 125, and to detect a fault state of the power tool comprising the control unit 110 based on the above-mentioned machine learning techniques. The fault state status may then be communicated by means of an output signal 560. The fault analysis module 530 may also trigger generation of a brake command 570 for halting the power tool in case an already occurred or imminent severe fault state is detected.

Figure 6:
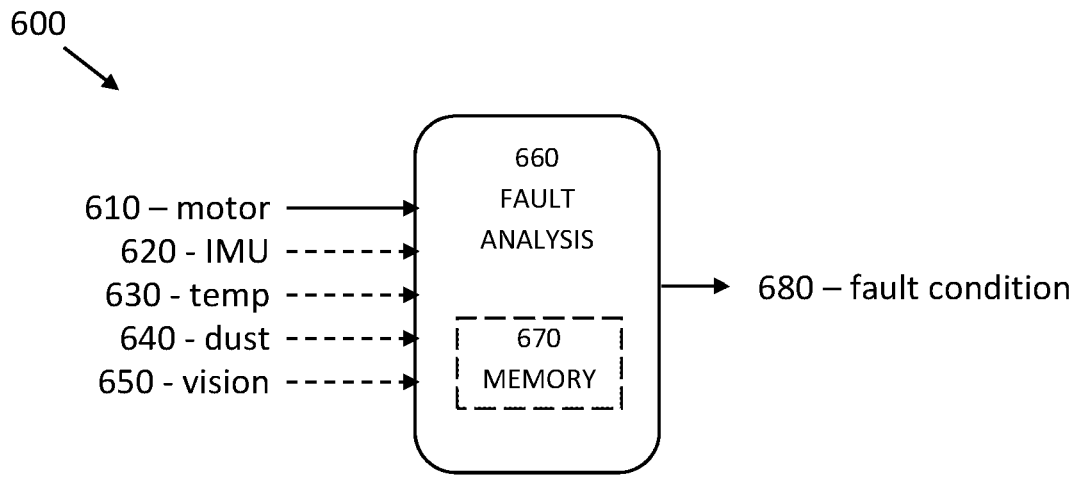
FIG. 6 schematically illustrates an automated fault detection system.

FIG. 6 illustrates a more general fault analysis system 600 according to the teachings herein. The system 600 is arranged to monitor various signals and internal states 610-650 of the power tool 100, 200, 300, and process these signals by a fault analysis module 660, which may comprise a random forest machine learning algorithm or a neural network as discussed above. The fault analysis system 600 may optionally, as will be discussed in more detail below, comprise a memory device 670 arranged to store monitored parameter values and states of the power tool. The fault analysis system 600 then outputs a current or imminent fault state signal 680.

The fault model used by the fault analysis module 660 may as discussed above use various parameters 610 associated with the electric motor, such as drawn current by the motor on the different motor phases. However, fault detection performance and prediction may be improved if additional sensor input signals are also used in combination with the electric motor parameter measurements.

Signals 620 from one or more IMUs attached to the power tool may be used to pick up vibration patterns which may be indicative of one or more fault states. For instance, a damaged cutting segments may give rise to a signature vibration pattern which can be picked up by the machine learning technique and used for fault detection.

Temperature sensors arranged in connection to key components on the power tool may also provide valuable information 630 which allows the machine learning algorithm to pick up patterns in the measurement data which is indicative of a given fault state or of a combination of different fault states.

A dust sensor may be arranged to detect a quantity of dust 640, and potentially also a size distribution of the dust particles. The amount of dust generated, and the size distribution of particles may be indicative of a given fault state. Thus, input data from a dust sensor may improve the fault detection and fault classification performance of the fault detection system 600.

Figure 9:
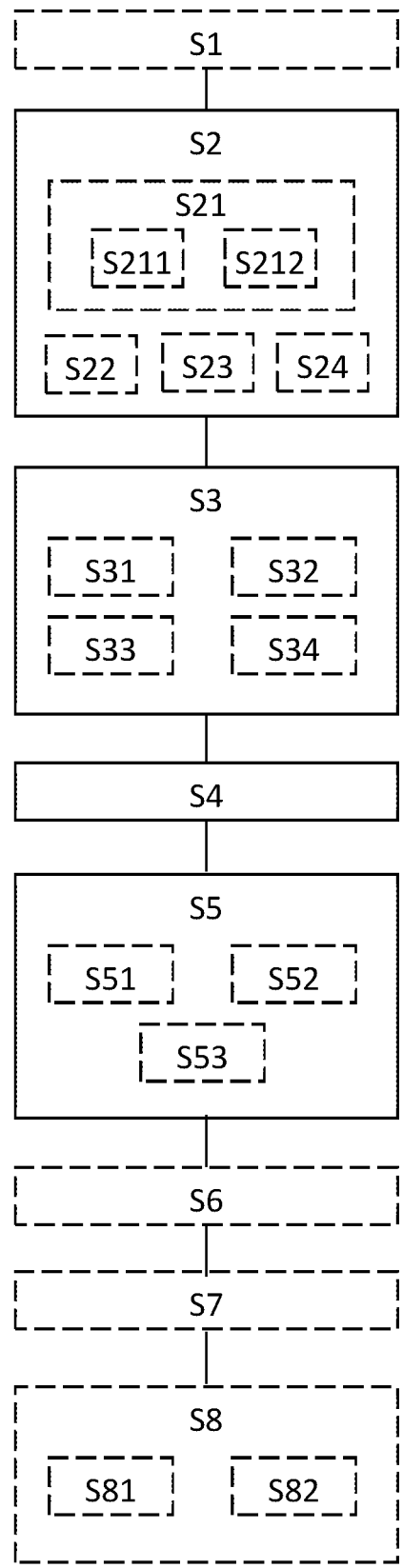
FIG. 9 is a flow chart illustrating methods.

To summarize, with reference to FIG. 9, there is disclosed herein a method performed in a control unit 110 of a power tool 100, 200, 300 driven by an electric motor 120, for detecting a fault state in the power tool 100, 200, 300, wherein the electric motor 120 is associated with a motor current drawn over a motor interface 125. The disclosed method comprises monitoring S2 a motor current of the electric motor drawn over the motor interface 125 during operation of the power tool 100, 200, 300. Thus, conceptually, the herein disclosed methods are based on measuring one or more operating parameters associated with the electric motor, and in particular the current drawn by the motor over the motor interface 125, such as the relative phases of these currents, and their amplitudes. Various transforms of the motor currents can also be used with advantage, such as a D-Q transformed current. As will be discussed below in connection to FIG. 12, Fourier transforms, or wavelet transforms, or the like can also be used with advantage to classify the power tool state. Thus, according to some aspects, the monitored parameter S21 of the electric motor may comprises a D-Q transformed motor current 540, which D-Q transformed motor current may optionally be transformed using a Fourier transform, a Wavelet transform, or some other type of frequency-domain based transform.

The proposed techniques are advantageously used together with machine learning structures, such as classifiers based on random forest structures or neural networks. These structures can be trained by subjecting them to input data gathered from usage of tools which have suffered a certain fault state. Thus, the methods disclosed herein may also comprise obtaining a fault model which has been a-priori trained using recorded values of monitored electric motor currents corresponding to the one or more fault states. It is, however, appreciated that a control unit in a power tool may not be trained in the field. Rather, the control unit is most likely arranged to obtain the fault model at the factory when being programmed, where the fault model has been trained elsewhere.

The methods and techniques discussed herein are particularly useful in detecting fault states in a rotatable work tool for processing concrete, such as a concrete saw blade used in a wall saw or a cut-off tool, a core drill, or a tool for grinding a concrete surface, such as a floor grinding tool. Thus, there is also disclosed herein a method performed in a control unit of a power tool 100, 200, 300 driven by an electric motor 120 connected to a rotatable work tool for processing concrete. The method is set up for detecting a fault condition in the rotatable work tool. As before, the electric motor is associated with a motor current drawn over a motor interface.

The disclosed method comprises:

monitoring S2 the motor current of the electric motor drawn over the motor interface 125 during operation of the rotatable work tool, obtaining S3 a fault model, wherein the fault model is configured to classify a state of the rotatable work tool into a pre-determined number of work tool states comprising one or more fault states, based on a series of electric motor current values, classifying S4 a state of the rotatable work tool into the pre-determined number of states based on the fault model and on one or more values of the monitored electric motor current, and triggering S5 an action by the control unit in case the state of the rotatable work tool is classified as a fault state.

A particular reason why the herein disclosed methods are so effective in detecting and classifying fault states in a rotatable work tool for processing a concrete work object is that they are so effective at detecting a change in the back-EMF of the electric machine used to drive the rotatable work tool. This change in the back EMF will be immediately visible in the motor current drawn over the interface. Thus, the herein disclosed techniques will be much more efficient in detecting a fault condition compared to, e.g., methods which instead use a power signal for the detection.

Figure 12:
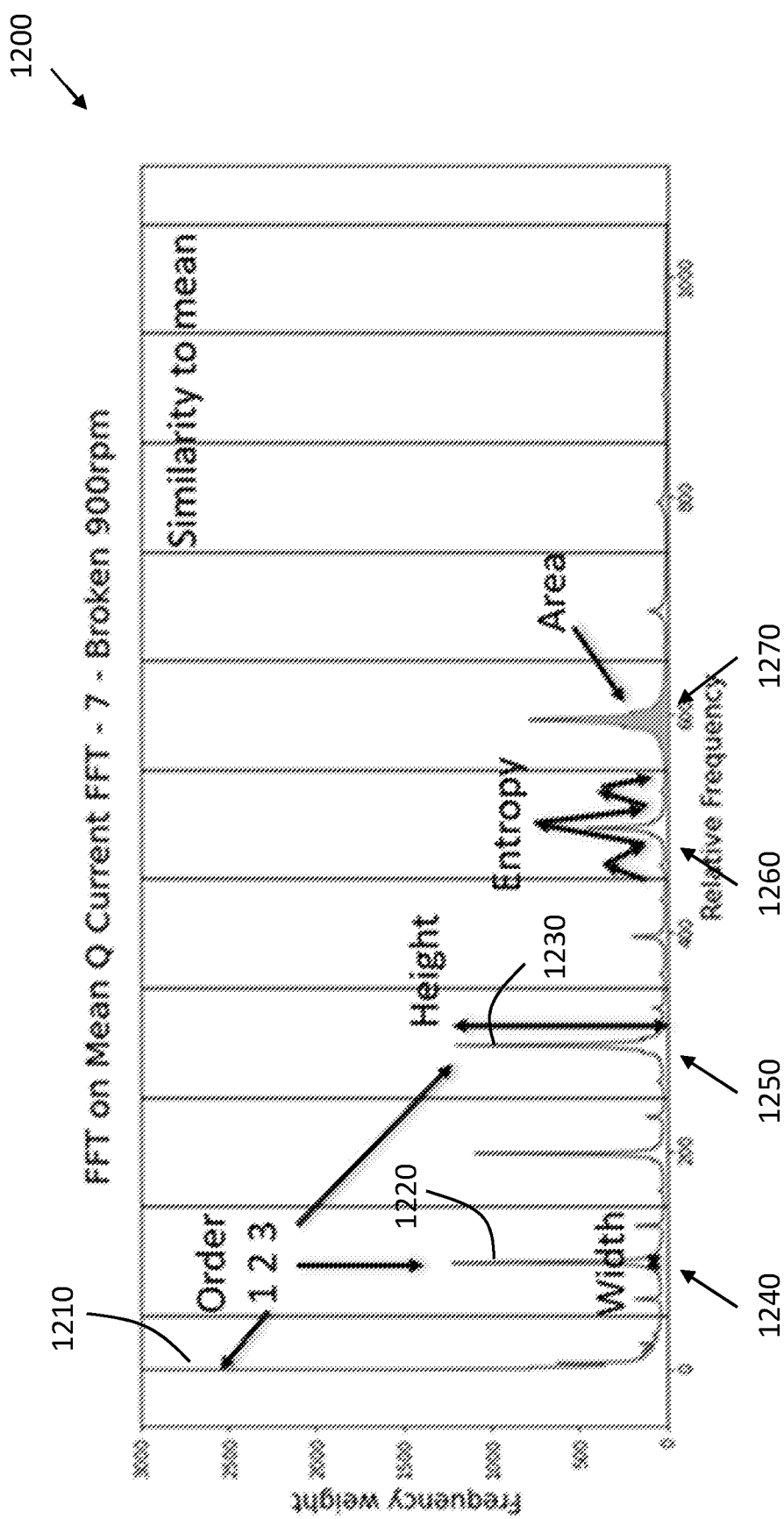
FIG. 12 is a graph illustrating meta data extracted from measurement data.

FIG. 12 shows an example of some types of meta data that can be generated from component of the D-Q transformed motor current. One such form of meta data on which the fault models can be trained and then executed for fault classification is the order of the say three peaks with highest magnitude. In the example, the highest peak 1210 occurs at DC, i.e., zero Hertz relative frequency. The second-most peak in terms of magnitude is the fourth peak 1230 followed by the second peak 1220. It has been found that this order of the peaks in terms of magnitude is indicative of various fault conditions. The magnitude or height (power) 1250 and the width (frequency bandwidth) 1240 of the frequency peaks in the spectrum are also indicative of certain fault conditions and therefore represents valuable input to the classifier algorithm. The area, i.e., the energy, 1270 in a sub-band associated with a frequency peak is also of interest, as well as the entropy 1260, which is indicative of how much the peak moves around and changes shape. Various measures of entropy may be defined, one example is a variance of the frequency bin magnitudes over a sub-band associated with a frequency peak.

This type of meta-data can be used to configure the fault model, optionally for a particular type of tool, or even for a given individual power tool. Data measured under different verified fault conditions is one type of valuable input during this training. Data collected when the power tool is operating as intended is also valuable and can be used for training.

This type of meta data can also be continuously stored by the power tool during operation in the memory module 1030. This stored data can then be off-loaded and used to refine the classification models.

To summarize, the methods disclosed herein optionally comprises monitoring S211 meta data associated with the D-Q transformed motor current, wherein the meta data comprises any of frequency width, relative magnitude, frequency sub-band power, and frequency sub-band entropy of a Fourier transformed representation 1200 of the D-Q transformed motor current.

Optionally, the method further comprises adjusting S212 a sample or window size of the Fourier transform in dependence of a motor speed. This means that the peak locations in terms of relative frequency remains at the same place independently of motor speed, which is an advantage. The ideal sample size for the Fourier transform (or wavelet transform or similar), may be obtained from a look-up table or other function indexed by motor speed. This look-up table or function can be pre-determined by laboratory experimentation and/or determined from analytical analysis.

An estimate of motor speed can be obtained by differentiating the rotation angle 550 with respect to time.

Optionally, the monitored parameter S22 of the electric motor comprises one or more state variables of an electric motor regulator module, such as the internal state of a PID regulator or Kalman filter, or the like, configured to regulate and control the operation of the electric motor 120. The monitored parameter S23 of the electric motor may also comprise an estimated rotor angle of the electric motor 550. This rotor angle can be obtained from the control unit which controls the electric motor by a sequence of relatively straight-forward calculations, as will be explained and exemplified in more detail below. The rotor angle is indicative of, e.g., sudden changes in tool rotational velocity, jerky motion by the cutting tool, and the like.

With reference again to FIG. 5, one example of a method for estimating rotor angle based on a current measurement made on the control interface 125 will now be described. Any of the variables below can be used as input for the fault detection mechanism. The method also uses a reference voltage associated with the electric motor, i.e., the reference voltage upon which the current regulator mechanism is based. It is assumed that the reference voltage (such as the reference voltage used by the current regulator for the electric motor) is sufficiently similar to the actual average voltage over the phases of the electric motor over a time window of interest.

The reference voltage and control interface current are first transformed into a complex stationary domain, i.e., the motor current $i_{ab}$ and motor reference voltage $v_{ab}$ are represented as complex numbers. This is often referred to as a Clarkes transform.

$$i_{ab} = i_a + j * i_b$$

$$v_{ab} = v_a + j * v_b$$

Based on these vectors, the complex valued magnetic flux of the stator $$\psi_{s,ab} = \psi_{s,a} + j * \psi_{s,b}$$

is estimated by integrating a difference between applied voltage and resistive voltage drop, adjusted by a damping factor which is proportional to a previously estimated stator flux. The damping factor is added mainly to make the estimated rotor angle value more robust.

Given the stator magnetic flux, a winding-induced flux is subtracted (derived based on a product of motor winding inductance and motor current) in order to obtain the complex rotor magnetic flux $$\psi_{r,ab} = \psi_{r,a} + j*\psi_{r,b}$$

Thus, let R represent motor resistance and L represent motor inductance, then the electric motor equations in the complex ab-plane (after Clarkes transform) are given by $$v_a = R*i_a + \frac{\partial \psi_{s,a}}{dt}$$

$$v_b = R*i_b + \frac{\partial \psi_{s,b}}{dt}$$

which can be rewritten as $$\frac{\partial \psi_{s,a}}{dt} = v_a - R*i_a$$

$$\frac{\partial \psi_{s,b}}{dt} = v_b - R*i_b$$

These values could be directly integrated to obtain stator flux. However, a damping term is preferably introduced to stabilize the estimated rotor angle. One example of such a damping term operation is $$\psi_{s,a}[k] + = (v_a[k] - R*i_a[k] - K*\psi_{s,a}[k-1])dt$$

$$\psi_{s,b}[k] + = (v_b[k] - R*i_b[k] - K*\psi_{s,b}[k-1])dt$$

where K is a damping factor, $K*\psi_{s,a}[k-1]$ is the damping term referred to above, k is a time index, and dt is a time step of the recursion. The winding-induced flux is subtracted as $$\psi_{r,a}[k] = \psi_{s,a}[k] - L*i_a[k]$$

$$\psi_{r,b}[k] = \psi_{s,b}[k] - L*i_b[k]$$

This value is then optionally filtered by a low-pass filter or the like to suppress noise and distortion. If filtering is applied, then some delay compensation may be necessary to account for delays introduced by the filtering and also other delays incurred by, e.g., computation and the like.

The rotor angle can be found as an angle of the estimated rotor flux $\psi_{r,ab}$, i.e., a rotor flux angle. This angle can be determined, e.g., using a signed arcus tangent function, also known as an a tan 2 function $$\alpha[k] = a\tan 2(\psi_{r,b}[k], \psi_{r,a}[k]) + \beta$$

where α is the rotor angle and where β is an angle compensation configured to compensate for introduced delays, e.g., by filtering operations.

Methods for representing a drawn current in terms of D-Q parameters are known in general and will therefore not be discussed in more detail herein.

Any of the variables above can be used as input to the fault detection algorithms discussed herein.

As mentioned above, the input to the fault detection system may furthermore comprise an output from any of an IMU, a temperature sensor, a dust sensor, and/or a vision-based sensor such as a camera.

The method also comprises obtaining S3 a fault model, wherein the fault model is configured to classify a state of the power tool 100, 200, 300 into a pre-determined number of states comprising one or more fault states, based on a series of electric motor parameter values. This series of electric motor parameter values may be comprised in time domain or in frequency domain, or in some other domain such as a wavelet domain. A combination of different domain signals can also be used, such as a combination of time domain and frequency domain signals.

According to some aspects, the fault model is based on a random forest ensemble learning method S31, of which a regression tree is a special case with only one tree. According to some other aspects, the fault model is based on a neural network S32. Both random forest algorithms and neural networks are generally known and will therefore not be discussed in more detail herein.

Advantageously, the methods may comprise configuring S33 the fault model in dependence of a type of power tool. This way the same fault model can be used for more than one type of tool. Certain tools may exhibit correlated behavior when it comes to certain types of fault states and be very different when it comes to other types of fault states. However, by parameterizing the fault model in dependence of the type (and/or model) of power tool, the fault detection capability of the fault model may be improved, at least in part since there is likely to be a larger set of data to use during initial training of the fault model.

Furthermore, it is appreciated that each fault state can be associated with one out of a pre-determined number of severity levels S34. This means that the fault model will not only provide information regarding the occurrence or risk of a fault state, but it will also provide information related to the severity of the fault state. This information may enable an operator to determine a suitable course of action in response to the fault detection. I.e., if the power tool should immediately be stopped and taken out of service, or if maintenance should be planned in the near future to fix the nuisance problem.

It is understood that the fault model is first initially trained S1 using recorded values of monitored electric motor parameters corresponding to the one or more fault states. This initial training need not, however, be performed by the control unit 110 during operation of the power tool, although this is certainly an option. It is preferred that this initial training is done off-line, e.g., in a lab or test facility. The training may be performed using gathered data from a plurality of power tools known to have suffered from one or more identified fault states. This data collection methods will be discussed in more detail below in connection to FIG. 7.

The method comprises classifying S4 a state of the power tool 100, 200, 300 into the pre-determined number of states based on the fault model and on one or more values of the monitored electric motor parameter.

Figure 8:
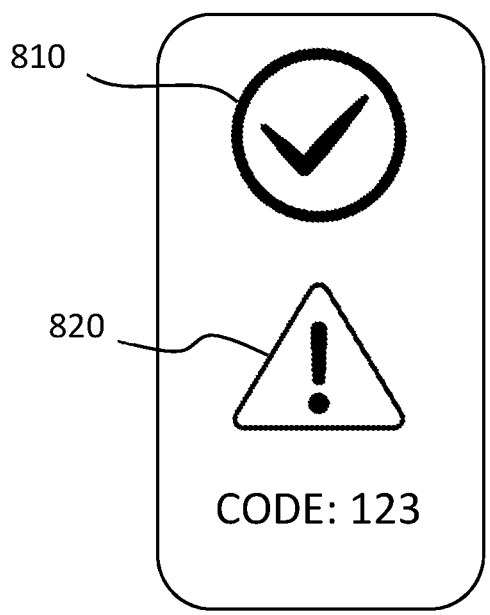
FIG. 8 shows an example of a warning display.

The method also comprises triggering S5 an action by the power tool in case the state of the power tool is classified as a fault state. This triggered action may, e.g., comprise notifying S51 an operator of the fault state and its associated severity level. This can for instance be done by a display such as that illustrated in FIG. 8 which can be integrated with the power tool 100, 200, 300 and controlled by the control unit 110. This display may indicate 810 that the power tool is not associated with any fault state, i.e., that the power tool is functioning normally. This may, e.g., be a green light symbol. If a fault state is detected by the fault detection system, a warning light 820 may be lit. The color of the warning light may vary in dependence of the severity level of the detected fault state. For instance, a yellow or orange light may indicate a medium severity issue while a red light warning symbol may indicate a severe fault state. The red light warning symbol may also be associated with an automatic shut-down of the tool, potentially complemented by an emergency brake of a rotatable work tool such as a cutting disc 105. A fault state identification code can also be displayed giving information about the particular fault state which has been detected.

As mentioned above, the triggered action may also comprise disabling S52 the power tool in case the current state is classified as a fault state associated with a pre-determined severity level, which disabling may be complemented by an emergency brake S53 of the tool by the electric motor.

Figure 7:
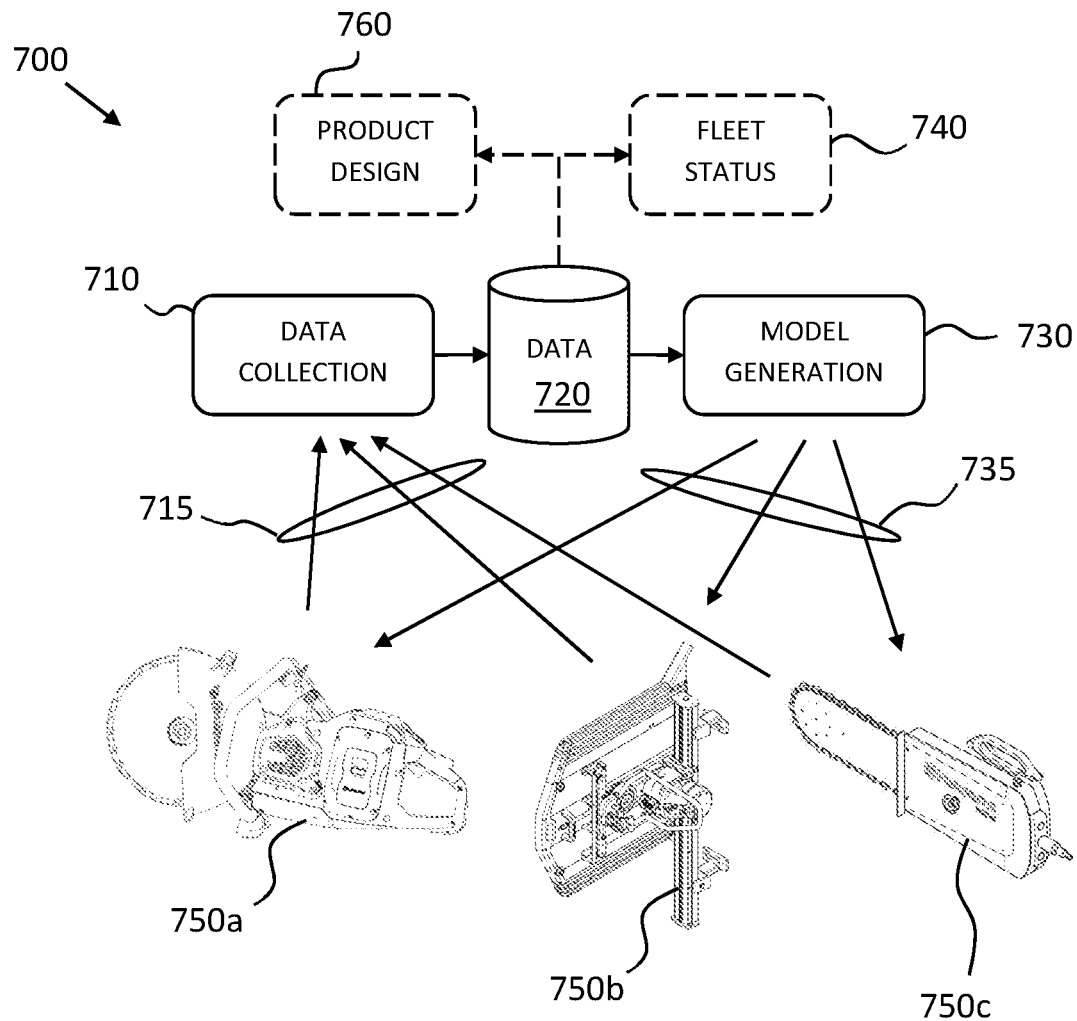
FIG. 7 illustrates a fault detection data collection system for a fleet of tools.

With reference to FIG. 7, the method may further comprise receiving S6 an updated fault model from an external entity 730 and replacing the fault model by the updated fault model. This means that the model used for fault detection by the control unit 110 can be regularly updated based on data which has been connected from power tools experiencing fault states in the field or based on additional laboratory experiments. A data collection entity 710 may be configured to gather data 715, i.e., measurements of various parameter values from a plurality of power tools 750a, 750b, 750c, potentially of different types. This data can be stored in a database 720 from which various fault models for detection different types of fault states can be trained. The updated fault models 735 can then be downloaded onto the power tools 750a, 750b, 750c, which then obtain updated models and therefore further improved fault detection performance.

It is appreciated that the database 720 can be of use for both monitoring fleet status 740, i.e., the performance of a group of power tools, and also for product design 760, since the database will comprise information indicating which error causes are more frequent than others, and when these fault states tend to occur.

To facilitate, e.g., a data collection system such as the data collection system shown in FIG. 7, the method may comprise storing S7 the recorded values of the monitored electric motor parameter in a memory module, such as the memory module 1030 discussed below in connection to FIG. 10. This memory module may be a memory device which is possible to off-load via wireless link or a memory device which can be removed from the power tool in order to off-load stored data, such as a secure digital card (SD-card) or the like.

According to further aspects, the methods disclosed herein may comprise configuring S8 an operating parameter of the power tool 100, 200, 300 in dependence of a detected fault state. This may, for instance, mean that the operating parameter of the power tool, such as the rotational velocity of a rotatable work tool, is adjusted to account for a detected fault state. For instance, if cutting segment glazing is detected, then the rotational velocity of the tool may automatically be somewhat decreased to mitigate the glazing. A pressure on the cutting segments may also be adjusted to account for the onset of glazing, e.g., by increased a feed rate of a core drill autofeeder or increasing a cutting speed of a wall saw. In other words, the methods disclosed herein may comprise configuring S81 a tool speed and/or segment pressure in dependence of a detected fault state associated with tool glazing.

In case the fault state is a state associated with oval shaped cutting disc, then the cutting tool speed may be somewhat increased to make the cutting disc more circular. The method may also comprise configuring S82 a pulsed drive of the electric motor pulse in dependence of a detected fault state associated with a non-circular cutting disc shape. A pulsed drive electric motor emulates a combustion engine drive arrangement which may alleviate issues with oval-shaped cutting discs.

Figure 10:
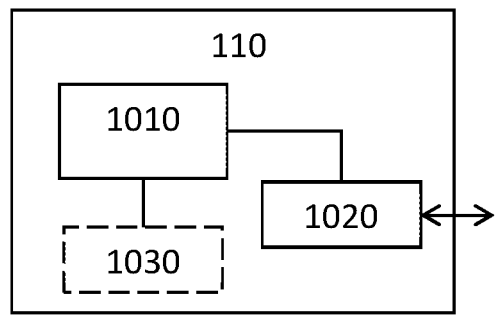
FIG. 10 schematically illustrates a control unit.

FIG. 10 schematically illustrates, in terms of a number of functional units, the general components of a control unit 110. Processing circuitry 1010 is provided using any combination of one or more of a suitable central processing unit CPU, multiprocessor, microcontroller, digital signal processor DSP, etc., capable of executing software instructions stored in a computer program product, e.g. in the form of a memory module 1030. The processing circuitry 1010 may further be provided as at least one application specific integrated circuit ASIC, or field programmable gate array FPGA.

Particularly, the processing circuitry 1010 is configured to cause the device 180 to perform a set of operations, or steps, such as the methods discussed in connection to FIG. 9 and the discussions above. For example, the memory module 1030 may store the set of operations, and the processing circuitry 1010 may be configured to retrieve the set of operations from the memory module 1030 to cause the device to perform the set of operations. The set of operations may be provided as a set of executable instructions. Thus, the processing circuitry 1010 is thereby arranged to execute methods as herein disclosed.

The memory module 1030 may also comprise persistent storage, which, for example, can be any single one or combination of magnetic memory, optical memory, solid state memory or even remotely mounted memory.

The device 110 may further comprise an interface 1020 for communications with at least one external device. As such the interface 1020 may comprise one or more transmitters and receivers, comprising analogue and digital components and a suitable number of ports for wireline or wireless communication.

The processing circuitry 1010 controls the general operation of the control unit 110, e.g., by sending data and control signals to the interface 1020 and the memory module 1030, by receiving data and reports from the interface 1020, and by retrieving data and instructions from the memory module 1030.

Figure 11:
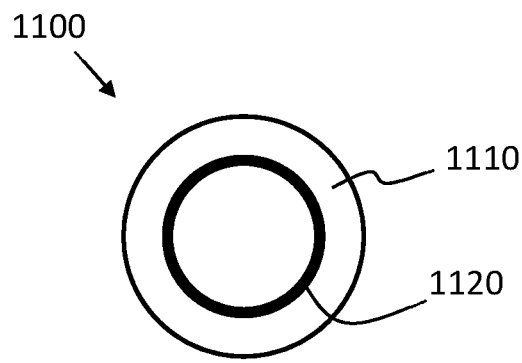
FIG. 11 schematically illustrates a computer program product.

FIG. 11 illustrates a computer readable medium 1110 carrying a computer program comprising program code means 1120 for performing the methods illustrated in FIG. 9, when said program product is run on a computer. The computer readable medium and the code means may together form a computer program product 1100.

The invention claimed is:

1. A method performed in a control unit of a power tool driven by an electric motor, for detecting a fault condition in the power tool, wherein the electric motor is associated with a motor current drawn over a motor interface, the method comprising
    monitoring the motor current of the electric motor drawn over the motor interface during operation of the power tool,
    obtaining a fault model, wherein the fault model is configured to classify a state of the power tool into a pre-determined number of power tool states comprising one or more fault states, based on a series of electric motor current values,
    classifying a state of the power tool into the pre-determined number of states based on the fault model and on one or more values of the monitored electric motor current, and
    triggering an action by the power tool in case the state of the power tool is classified as a fault state.

2. The method according to claim 1, further comprising initially training the fault model using recorded values of monitored electric motor currents corresponding to the one or more fault states.

3. The method according to claim 1, wherein the monitored current of the electric motor comprises a D-Q transformed motor current.

4. The method according to claim 3, further comprising monitoring meta data associated with the D-Q transformed motor current, wherein the meta data comprises any of frequency width, relative magnitude, frequency sub-band power, and frequency sub-band entropy of a Fourier transformed representation of the D-Q transformed motor current.

5. The method according to claim 4, further comprising adjusting a sample or window size of the Fourier transformed representation in dependence of a motor speed.

6. The method according to claim 1, further comprising monitoring an output from any of an inertial measurement unit, IMU, a temperature sensor, a dust sensor, and/or a vision-based sensor.

7. The method according to claim 1, wherein the fault model is based on a random forest ensemble learning method, or a neural network.

8. The method according to claim 1, comprising configuring the fault model in dependence of a type of power tool.

9. The method according to claim 1, wherein each fault state is associated with one out of a pre-determined number of severity levels.

10. The method according to claim 9, wherein the triggered action comprises notifying an operator of the fault state and its associated severity level, or disabling the power tool in case the current state is classified as a fault state associated with a pre-determined severity level.

11. The method according to claim 10, wherein disabling the power tool comprises executing an emergency brake by the electric motor.

12. The method according to claim 1, wherein the method further comprises receiving an updated fault model from an external entity and replacing the fault model by the updated fault model.

13. The method according to claim 1, comprising storing the recorded values of the monitored electric motor current in a memory module, or
configuring an operating parameter of the power tool in dependence of a detected fault state.

14. The method according to claim 13, comprising configuring a tool speed and/or segment pressure in dependence of a detected fault state associated with tool glazing.

15. The method according to claim 14, comprising configuring a pulsed drive of the electric motor pulse in dependence of a detected fault state associated with a non-circular cutting disc shape.

16. The method according to claim 1, wherein the power tool is a hand-held power tool and/or a concrete processing tool comprising a rotatable abrasive member for processing concrete.

17. A control unit for a power tool comprising processing circuitry configured to execute the method according to claim 1, wherein the processing circuitry comprises a memory module, and wherein the memory module is arranged to store a time history of the monitored current values of the electric motor.

18. A power tool comprising the control unit according to claim 17, wherein the power tool is a cut-off tool, a core drill, or a wall saw.

19. A control unit for a power tool driven by an electric motor, wherein the electric motor is associated with a motor current drawn over a motor interface,
the control unit comprising a memory module arranged to store a plurality of fault models corresponding to respective rotatable concrete work tools, where each fault model in the plurality of fault models is configured to classify a state of a respective type of rotatable work tool into a pre-determined number of states comprising one or more fault states, based on a series of electric motor current values,
wherein the control unit is arranged to select a fault model from the plurality of fault models in dependence of a current type of rotatable work tool attached to the power tool,
wherein the control unit is arranged to monitor the motor current of the electric motor drawn over the motor interface during operation of the power tool, and
classify a state of the power tool into the pre-determined number of states based on the fault model and on one or more values of the monitored electric motor current.

20. A method performed in a control unit of a power tool driven by an electric motor, for detecting a fault condition in the power tool, wherein the electric motor is associated with a motor current drawn over a motor interface, the method comprising
obtaining a fault model, wherein the fault model is configured to classify a state of the power tool into a pre-determined number of power tool states comprising one or more fault states, based on a comparison of a series of electric motor current values drawn over the motor interface during operation of the power tool to a corresponding series of electric motor current values drawn over a motor interface of a power tool having suffered a known fault condition, and
classifying a state of the power tool into the pre-determined number of states based on the fault model and on one or more values of the monitored electric motor current.

* * * * *